(12) United States Patent
Chauffour et al.

(10) Patent No.: US 7,908,355 B2
(45) Date of Patent: Mar. 15, 2011

(54) METHOD FOR IMPROVING NETWORK SERVER LOAD BALANCING

(75) Inventors: Pascal Chauffour, Cagnes sur Mer (FR); Eric Lebrun, Carros (FR); Valerie Mahe, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 10/460,443

(22) Filed: Jun. 12, 2003

(65) Prior Publication Data

US 2003/0236888 A1 Dec. 25, 2003

(30) Foreign Application Priority Data

Jun. 20, 2002 (EP) .................................... 02368062

(51) Int. Cl.
G06F 15/173 (2006.01)
G06F 9/46 (2006.01)

(52) U.S. Cl. ......... 709/224; 709/223; 709/225; 709/226; 718/105

(58) Field of Classification Search ........................ None
See application file for complete search history.

(56) References Cited

U.S. PATENT DOCUMENTS

| | | | | |
|---|---|---|---|---|
| 4,761,563 | A * | 8/1988 | Ross et al. ....................... 307/87 |
| 5,283,897 | A * | 2/1994 | Georgiadis et al. ........... 718/105 |
| 5,870,455 | A * | 2/1999 | Campbell et al. .......... 379/88.18 |
| 6,014,669 | A * | 1/2000 | Slaughter et al. ............. 707/610 |
| 6,067,545 | A * | 5/2000 | Wolff ..................................... 1/1 |
| 6,070,191 | A * | 5/2000 | Narendran et al. ........... 709/226 |
| 6,128,657 | A * | 10/2000 | Okanoya et al. .............. 709/224 |
| 6,173,311 | B1 | 1/2001 | Hassett et al. ................ 709/202 |
| 6,278,965 | B1 * | 8/2001 | Glass et al. ..................... 703/22 |
| 6,715,098 | B2 * | 3/2004 | Chen et al. ........................ 714/3 |
| 6,973,517 | B1 * | 12/2005 | Golden et al. ................ 710/104 |
| 7,016,484 | B2 * | 3/2006 | Kumar et al. ............ 379/221.06 |
| 7,055,173 | B1 * | 5/2006 | Chaganty et al. ............... 726/11 |
| 7,106,698 | B1 * | 9/2006 | Basso et al. .................... 370/232 |
| 7,111,189 | B1 * | 9/2006 | Sicola et al. ....................... 714/6 |
| 7,124,188 | B2 * | 10/2006 | Mangipudi et al. ........... 709/226 |
| 7,380,001 | B2 * | 5/2008 | Masuyama et al. ........... 709/226 |
| 7,590,746 | B2 * | 9/2009 | Slater et al. ................... 709/229 |
| 2002/0128925 | A1 * | 9/2002 | Angeles .......................... 705/26 |
| 2003/0018927 | A1 * | 1/2003 | Gadir et al. ....................... 714/4 |
| 2003/0108052 | A1 * | 6/2003 | Inoue et al. .................... 370/399 |

(Continued)

FOREIGN PATENT DOCUMENTS

EP 903901 3/1999

*Primary Examiner* — David E England

(74) *Attorney, Agent, or Firm* — Hoffman Warnick LLC

(57) ABSTRACT

A method for improving network server load balancing in a system that has a plurality of network servers connected by an Internet access LAN to the Internet, a back-end access LAN connected to several database servers, and a network load balancer for selecting one of the network servers according to weights associated with the network servers. Link connectivity is monitored cyclically from each network server, and a status indicator is set to UP if all of the links associated with the network server are available, or to DOWN if at least one link is unavailable. The network servers send their status indicators to the network load balancer. The network load balancer changes the weight associated with a network server to a non-eligible value if the associated status indicator changes from UP to DOWN.

7 Claims, 3 Drawing Sheets

U.S. PATENT DOCUMENTS

| | | | |
|---|---|---|---|
| 2003/0179707 A1* | 9/2003 | Bare | 370/235 |
| 2003/0225877 A1* | 12/2003 | Packman et al. | 709/224 |
| 2003/0236888 A1* | 12/2003 | Chauffour et al. | 709/226 |
| 2004/0024853 A1* | 2/2004 | Cates et al. | 709/223 |
| 2004/0107286 A1* | 6/2004 | Larson et al. | 709/229 |
| 2004/0158605 A1* | 8/2004 | Benhase et al. | 709/202 |
| 2004/0162901 A1* | 8/2004 | Mangipudi et al. | 709/225 |
| 2008/0033770 A1* | 2/2008 | Barth et al. | 705/5 |

* cited by examiner

METHOD FOR IMPROVING NETWORK SERVER LOAD BALANCING

TECHNICAL FIELD

The present invention relates to data transmission systems wherein a plurality of network servers provide Internet access to data stored in database servers, and relates in particular to a method for improving load balancing of the network servers in such a data transmission system.

BACKGROUND

The Internet is a worldwide network using a common protocol, the TCP/IP (Transmission Control Protocol/Internet Protocol), for communicating information between computers. Client computers act as originators of the communication and request data; network server computers act as destinations of the communication and provide the requested data. A network client computer reaches a network server computer by specifying the server's Internet address. This is done by entering a URL (Uniform Resource Locator) to a browser, which is a program used to access the Internet. Access to particular data on the network server computer is then performed in several ways. One way is to complete the base URL with suffixes identifying locally the exact data path. Another way is to retrieve data by clicking on a data link which yields a local data request from the Network server itself or a remote data request from another computer accessible from the network server computer.

Computers acting as network servers may receive simultaneous requests from various network client computers. Consequently, they may be not able to answer the clients in a reasonable time. One way to solve this problem of data availability over the Internet is to clone the network server in several computers. In order to have a single address over the Internet network and to hide the existence of clones, a special network server computer called a Network Load Balancer (NLB) has been created. An NLB simplifies access to the data on network server computers by showing and maintaining a single URL to the Internet network, in the form of a virtual IP address (VIP), and improves performance by distributing the request to the least heavily loaded network server.

The NLB enlists the network server with the best performance to answer requests received from the Internet network having the VIP address. In order to dispatch the IP packets to this network server, network server performance metrics are statistically based on the time to answer sample requests made by the NLB. Based upon the measured-time-to-answer for a given network server, a weight is assigned to the server, which weight is used to compare its performance against the other network servers associated with the same VIP. Every packet coming from the same network client belonging to the same connection will be dispatched to the selected network server.

In a typical implementation, each network server is physically connected to two Local Area Networks (LAN): the Internet access LAN, which carries requests coming from the Internet, and the back-end access LAN, which provides data access for the network servers to several database servers, and also for remote administration of the network and database servers.

The performance measurement is done by sending sample requests over one of the two LANs. A limitation of this method is that the performance metrics do not guarantee the availability of the data requested by the network client computer. In case of a connection problem over one of the links, the NLB may continue to dispatch to a server because the NLB is not aware of the failure of the connection.

SUMMARY

Accordingly, an object of the invention is to improve load balancing between the network servers of a data transmission system by cyclically monitoring the connectivity over the links associated with each network server in order to ensure the availability of the requested data.

The invention includes a method for improving network server load balancing in a system including a plurality of network servers connected between an Internet access LAN and a back-end access LAN. The Internet access LAN is connected to the Internet by an Internet access router, and the back-end access LAN is connected to several database routers from which users of the Internet can request data. A network load balancer selects one of the network servers according to performance metrics based upon weights associated with each network server. The inventive method comprises the steps of cyclically monitoring, from each network server, the connectivity over the links associated with the network server, setting a status (NTAS) indicator in each network server to an UP condition if each of the links is available and to a DOWN condition if at least one of the links is unavailable, sending, from each network server, the associated status (NTAS) to the network load balancer, and changing, in the network load balancer, the weight associated with a network server to a non-eligible value if the associated NTAS has changed from the UP condition to the DOWN condition.

BRIEF DESCRIPTION OF THE DRAWINGS

The above and other objects, features, and advantages of the invention will be better understood by reading the following more particular description of the invention in conjunction with the accompanying drawings wherein.

DETAILED DESCRIPTION

Figure 1:
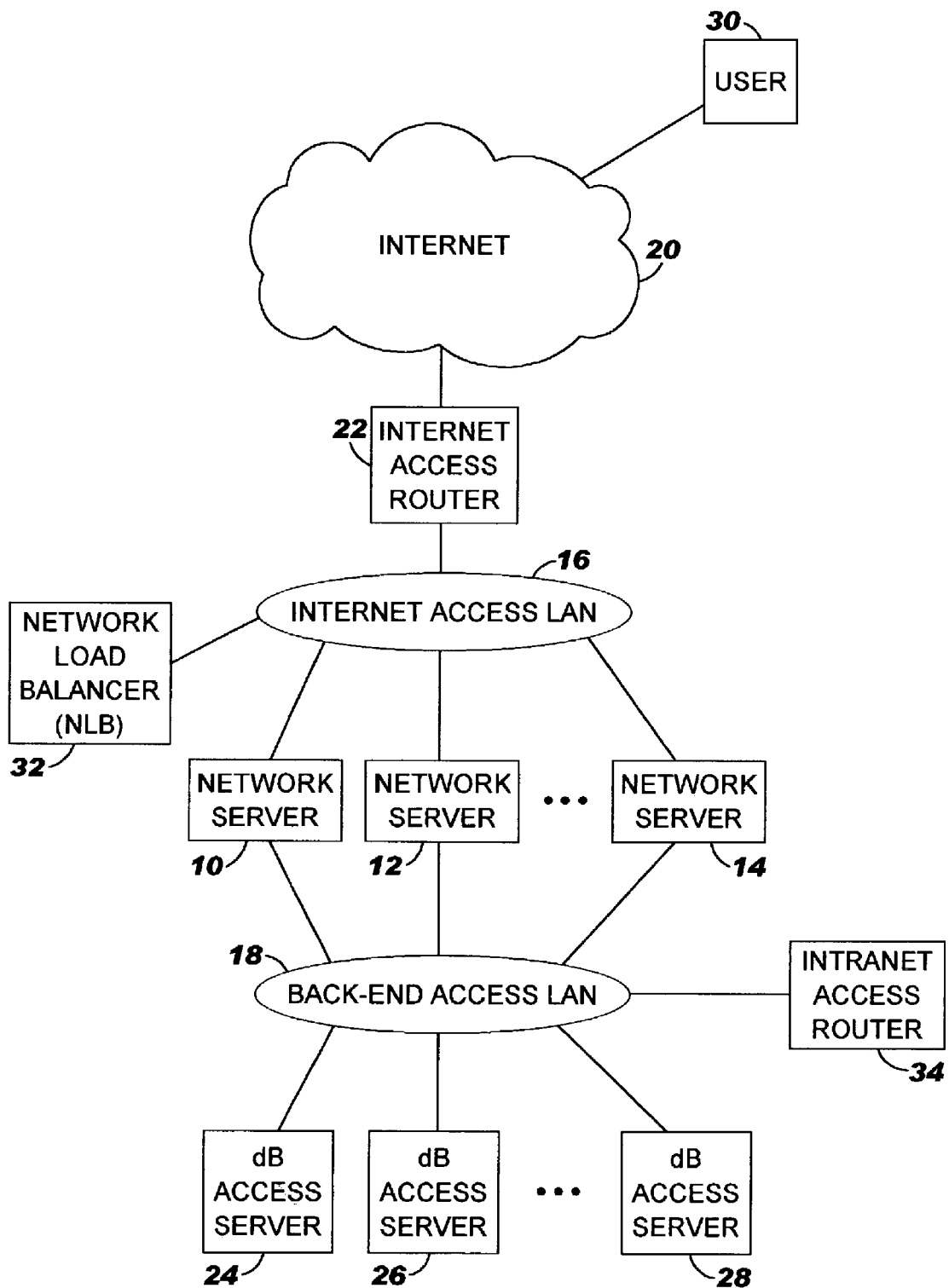
FIG. 1 is a block-diagram representing a system wherein the method according to the invention may be implemented.

As shown in FIG. 1, an exemplary system wherein the method according to the invention may be implemented comprises a plurality of network servers 10, 12, 14 connected between an Internet access LAN 16 and a back-end access LAN 18. The Internet Access LAN 16 is connected to the Internet network 20 by an Internet access router 22. To provide data to the system users, several database servers 24, 26, 28 are connected to the Back End Access LAN 18. Thus, a user 30 may request data that is stored in any one of the database servers 24, 26, 28. Such requests using the Hypertext Transfer Protocol (HTTP) are directed to one of the network servers which has been selected as providing the best performance by a Network Load Balancer (NLB) 32 based on a comparison of weights assigned to the network servers. Data requested by a user may be provided from other servers (not shown) located in the Intranet and feeding the data via an Intranet access router 34.

The method according to the invention includes two parts. A first part called the Network Dispatcher Plus Client (NDPC) is a process running in the network servers 10, 12, or 14. A second part called the Network Dispatcher Plus Server (NDPS) is a process running in the NLB 32.

The NDPC is a process that cyclically monitors the connectivity over the links associated with the network servers. This is done by choosing network targets to answer availability requests. Such network targets are independent of the network server, are connected to the LANs, and are required by the network server for providing data to the network clients. These targets may include the Internet access router 22, database servers 24, 26, and 28, and Intranet access router 34. As an example, the targets which can be used for network server 10 include Internet access router 22, database server 24, and Intranet access router 34.

Monitoring of the connectivity over a link is achieved by making an individual network target availability test that includes checking the reachability of the network target. In a preferred embodiment of the invention, such checking can be done by transmitting an echo request message (a ping) from the network server to the network target. The target is presumed to be available and connectivity is presumed to be guaranteed if a response to the echo request message is received before a predetermined time out. Other methods may be used as well to check the reachability of a network target, such as transmitting an HTTP head request.

A Network Target Monitoring Cycle (NTMC) includes several individual network target availability tests for checking the reachability of all the selected targets. For each of the network servers, the individual network target availability tests may be consolidated in a global Network Target Availability Status (NTAS) indicator. If one or more of the targets tested in an NTMC is unavailable, the NTAS will be set to DOWN for this cycle. The NTAS is set to UP for this cycle only when all the targets are available (reachable).

At the end of each NTMC cycle, the NTAS value is sent to NLB 32, for example via a configurable dedicated TCP port. Each NTMC cycle may be followed by period of no activity, which is the Network Target Monitoring Cycle Delay (NTMCD), while waiting for the next cycle.

Figure 2:
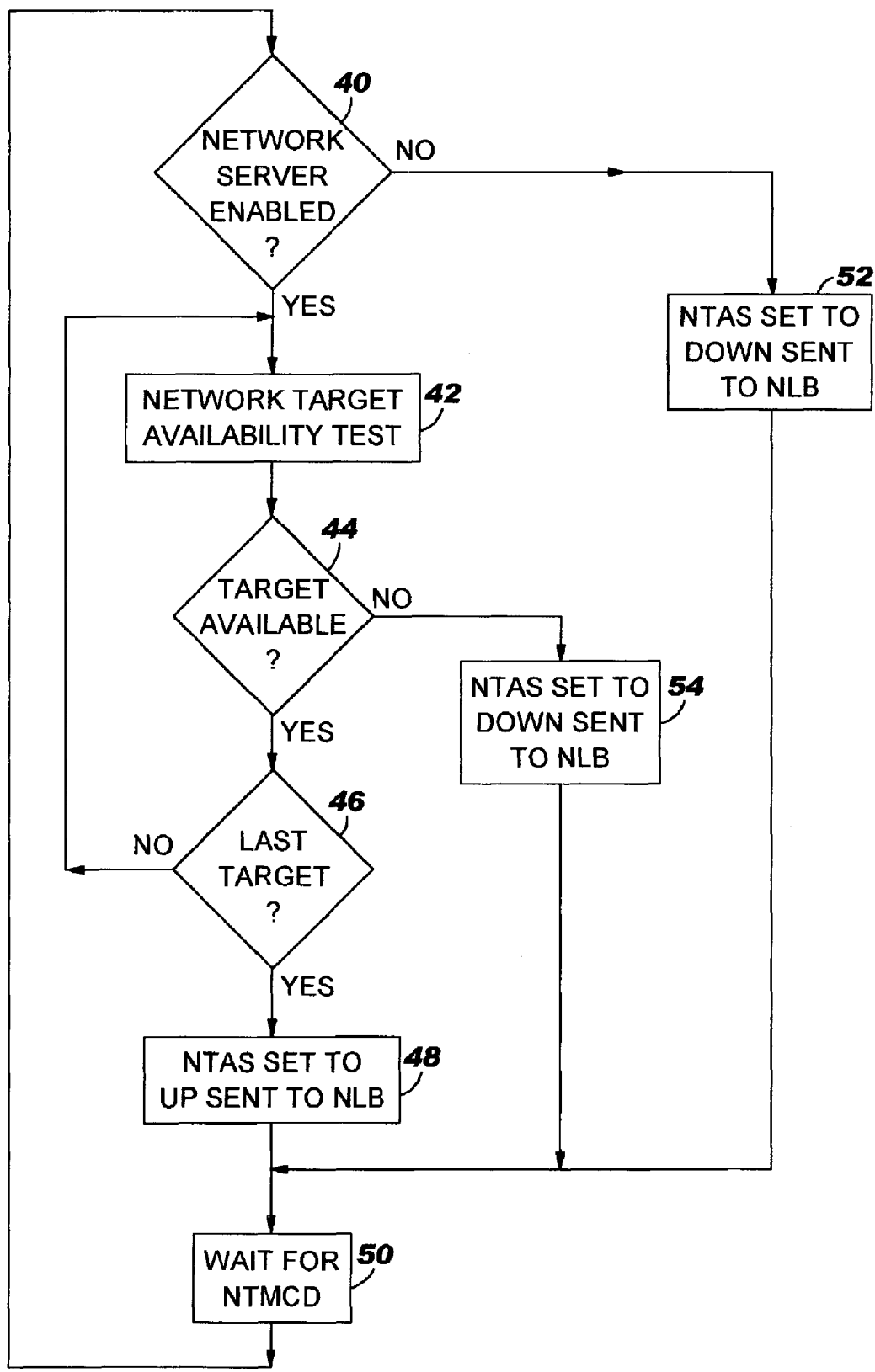
FIG. 2 is a flow chart representing aspects of the method running in each of the network servers of the system illustrated in FIG. 1.

A flow chart corresponding to the NDPC is illustrated in FIG. 2. A first operation is to check whether the network server is enabled (step 40). If so, an individual target availability test is made for each network target (step 42), for example by sending an echo request message to the target as mentioned above. When completed, the test determines whether the target is reachable (step 44). Then, a check is made to determine whether this target is the last one for the network server being considered (step 46). If not, the process loops back to the step of making a new individual target availability test for the following target (step 42).

When all the network targets have been tested, the NTAS message consolidating all the individual tests is sent by the network server to the NLB (step 48). Since the tests have been successful for all network targets, the NTAS is set to UP. Then, the network server waits for the duration of the NTMCD before starting a new target availability cycle (step 50).

If it is determined that the network server is disabled (step 40), the NTAS is immediately sent to the NLB without making the target availability tests (step 52). Such an NTAS is set to the DOWN condition. Likewise, if it is determined that the tested target is not reachable (step 44), the NTAS set to DOWN is sent to the NLB (step 54). The network server then waits for the duration of the NTMCD before starting a new target availability cycle (step 50) after the NTAS set to DOWN has been sent.

Figure 3:
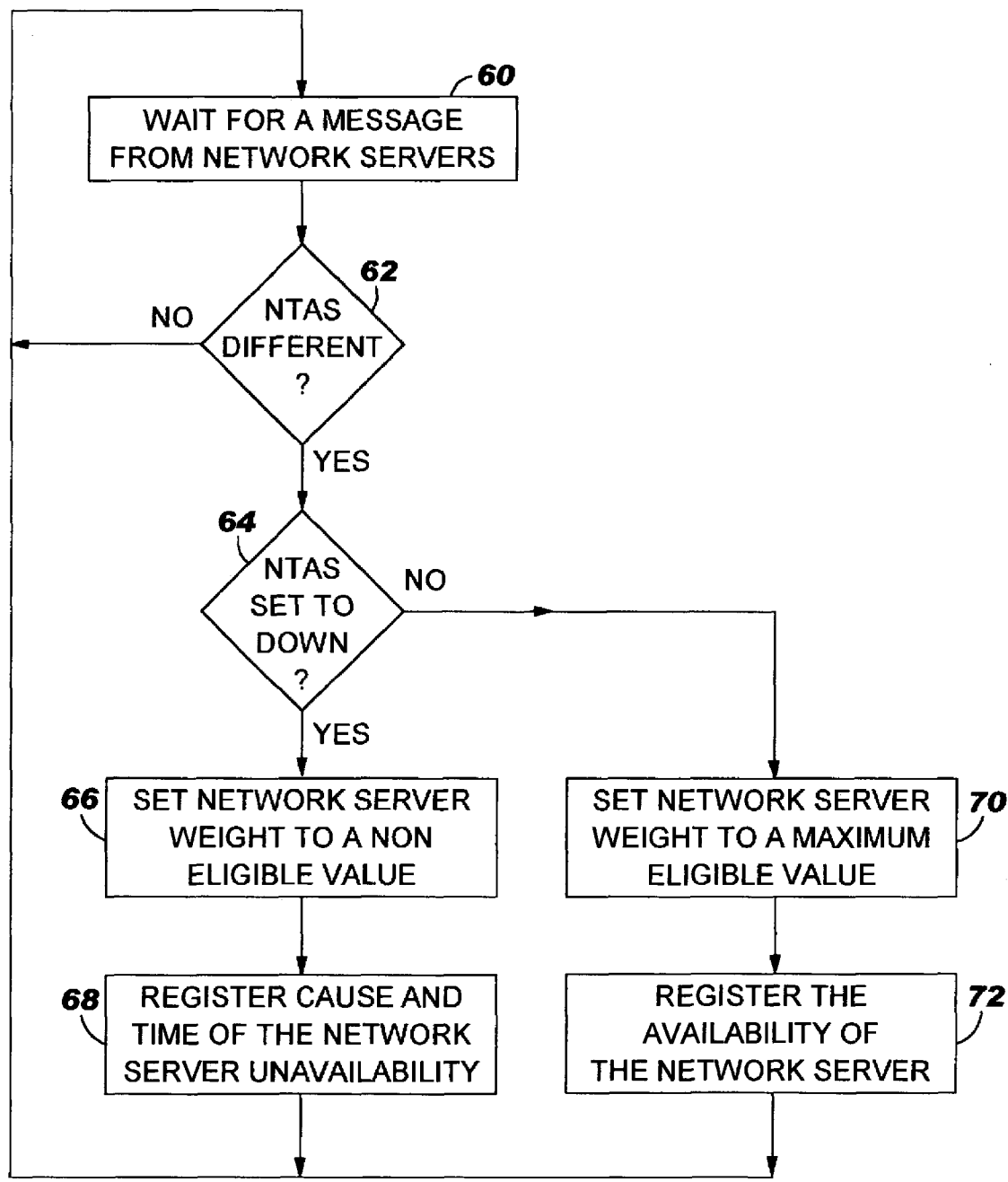
FIG. 3 is a flow chart representing aspects of the method running in the Network Load Balancer (NLB).

A flow chart corresponding to the NDPS in the NLB is illustrated in FIG. 3. The first step is to wait for a NTAS message from a network server (step 60). When such a message is received by the NLB, a check is made to determine whether the NTAS is different from the preceding NTAS received from the same network server (step 62). If it is not different, no action is taken, and the process loops back to the step of waiting for a message from another network server (step 60). If the NTAS is different from the preceding NTAS, a check is made to determine whether it corresponds to the DOWN condition (step 64). If so, this means that the network server has become unavailable, and the weight of the network server is set to a non-eligible value such as a negative value (step 66). At the same time, the cause of this unavailability and the current time may be registered (step 68). If the NTAS changes from the DOWN condition to the UP condition, this means that the network server which was unavailable has become available. In such a case, the weight of the network server is set to the maximum eligible value (step 70) and the availability of the network server is registered (step 72).

We claim:

1. A load-balancing method, comprising:
   providing a network that includes a plurality of non-load balancing network servers connected between an Internet access LAN and a back-end access LAN, and a network load balancer for selecting one of the network servers according to performance metrics based on weights that are associated with the network servers, where the Internet access LAN is connected to the Internet through an Internet access router and the back-end access LAN is connected to a plurality of database access servers;
   cyclically monitoring, by every one of the plurality of network servers, availability of external links connected to a corresponding network server by attempting, by the corresponding network server, to contact each of a plurality of various network targets outside the network in turn;
   setting a status indicator associated with the network server to up if all the links that have been cyclically monitored are available, and setting the status indicator to down if at least one of the links is unavailable;
   sending the status indicator to the load balancer;
   and changing a weight associated with the network server in the load balancer to an ineligible value if the status indicator has changed from up to down since the status indicator was last received by the load balancer.

2. The method of claim 1, wherein the step of monitoring availability of links includes the steps of:
   selecting a network target for a link;
   sending an echo request message over the link to the network target; and
   indicating that the link is available if a response message is received from the network target within a predetermined period of time.

3. The method of claim 2, wherein the network target is one of the plurality of various network targets, which are: the Internet access router, the database access servers, and an Intranet access router that is connected to the back-end access LAN.

4. The method of claim 1, further comprising the steps of checking whether the network server is enabled before monitoring availability of links connected to the network server, and setting the status indicator to down if the network server is disabled.

5. The method of claim 4, further comprising the step of changing the weight associated with the network server in the load balancer to a predetermined maximum value when the status indicator changes from down to up.

6. The method of claim 5, further comprising in case that the status indicator associated with the network server is down, performing the cyclically monitoring, setting, sending and changing processes again after a predetermined period of time has elapsed following completion of a Network Target Monitoring Cycle.

7. The method of claim 1, wherein the network server waits for a target monitoring cycle delay time after executing the step of monitoring availability of links connected to the network server.

* * * * *